United States Patent [19]
Arita et al.

[11] Patent Number: 5,664,240
[45] Date of Patent: Sep. 2, 1997

[54] APPARATUS AND METHOD FOR DELAYING THE RETRACTION OF AN EXTENDIBLE LENS INTO A CAMERA BODY WHEN THE CAMERA IS SWITCHED OFF

[75] Inventors: Hiroshi Arita, Kawasaki; Toshiharu Ueda, Yokohama, both of Japan

[73] Assignee: Canon Kabushiki Kaisha, Tokyo, Japan

[21] Appl. No.: 692,124

[22] Filed: Aug. 5, 1996

Related U.S. Application Data

[63] Continuation of Ser. No. 278,323, Jul. 21, 1994, abandoned.

[30] Foreign Application Priority Data

Jul. 27, 1993 [JP] Japan ................................. 5-203722

[51] Int. Cl.$^6$ ................................................ G03B 13/00
[52] U.S. Cl. ................................. 396/137; 396/349
[58] Field of Search ................................. 396/137, 348, 396/349

[56] References Cited

U.S. PATENT DOCUMENTS

| | | |
|---|---|---|
| 4,429,974 | 2/1984 | Suzuki . |
| 4,629,305 | 12/1986 | Sato et al. . |
| 5,124,737 | 6/1992 | Inoue et al. . |
| 5,241,334 | 8/1993 | Kobayashi et al. . |
| 5,258,805 | 11/1993 | Aoki et al. . |
| 5,376,985 | 12/1994 | Saito et al. . |

FOREIGN PATENT DOCUMENTS 4-8412  3/1992  Japan .

*Primary Examiner*—David M. Gray
*Attorney, Agent, or Firm*—Fitzpatrick, Cella, Harper & Scinto

[57] ABSTRACT

Apparatus for delaying a camera extendible lens from being automatically withdrawn into the camera body by the camera lens driver when the camera mode setting switch is set to or through a camera OFF setting includes control structure for (i) determining that the camera mode setting switch has been set to the camera OFF setting, (ii) causing a predetermined time to be counted after it has been determined that the camera mode setting switch has been set to the camera OFF setting, (iii) again determining that the camera mode setting switch has been set to the camera OFF setting after the predetermined time has finished being counted, and (iv) causing the camera lens driver to withdraw the lens into the camera body only if it has been again determined that the camera mode setting switch has been set to the camera OFF setting. Preferably, this prevents the extendible lens from being automatically withdrawn into the camera body every time the mode setting switch is turned through the OFF setting.

15 Claims, 6 Drawing Sheets

APPARATUS AND METHOD FOR DELAYING THE RETRACTION OF AN EXTENDIBLE LENS INTO A CAMERA BODY WHEN THE CAMERA IS SWITCHED OFF

This application is a continuation of application Ser. No. 08/278,323, filed Jul. 21, 1994, now abandoned.

BACKGROUND OF THE INVENTION

1. Field of the Invention

The present invention relates to an improvement in a camera which is capable of accommodating an automatic optical unit in accordance with the operation of the operation member.

2. Description of the Related Art

In recent years, cameras have become smaller and lighter. For improved portability, many cameras adopt a structure in which the lens barrel is extended out from the camera body when the camera is ON, while the lens barrel is retracted into the camera body when the camera is OFF.

Some cameras which have a plurality of photographing modes (such as a close-up mode, a night photographing mode, and the like) are provided with a dial which turns the camera ON/OFF, and sets the various photographing modes described above.

In the above-described example, however, the user may momentarily turn the camera OFF by mistake when trying to set a photographing mode. Even when the photographing mode is quickly reset, the lens barrel is retracted into the camera and then extended therefrom, which may be very inconvenient for the user.

For making the camera easier to operate, photographing modes which are used frequently are placed at both sides of the main switch OFF position. In this case, the dial frequently passes through the OFF position when setting a photographing mode, which often results in the lens barrel being retracted into the camera and then extended therefrom.

SUMMARY OF THE INVENTION

According to one aspect of the present invention there is provided a camera, an optical equipment, or an optical unit drive control apparatus comprising s setting means for setting at least a first and a second mode; drive means for causing the optical unit to be in an accommodated state in response to a setting operation of the first mode by the setting means; and a changing means for causing a time period required to set the first mode to be different from a time period required to set the second mode.

Other aspects of the present invention will become apparent from the preferable embodiments illustrated below.

DETAILED DESCRIPTION OF THE PREFERRED EMBODIMENTS

The present invention will be described in detail below with reference to the illustrated embodiments.

Figure 1A:
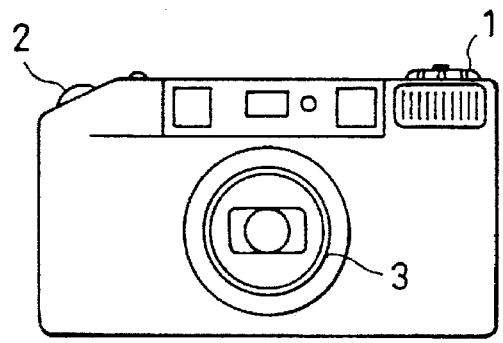
FIGS. 1(a) and 1(b) are front and top views of a collapsible barrel type camera in each embodiment of the present invention.
Figure 1B:
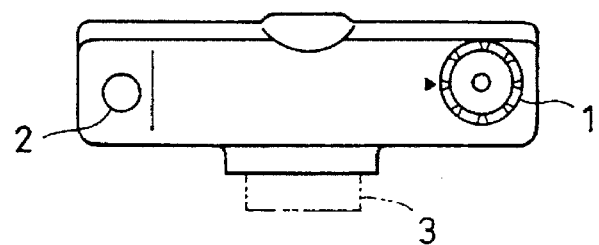

FIGS. 1(a) and 1(b) respectively illustrate a front view and a top view of a collapsible barrel type camera in a first embodiment of the present invention.

Referring to FIG. 1(a), reference numeral 1 denotes a dial operation section (details shown in FIG. 2) for switching the main switch ON/OFF, or setting photographing modes such as normal photographing modes, close-up photographing mode, or the like; and reference numeral 2 denotes a shutter release switch which starts the photographing operations. Reference numeral 3 denotes a lens barrel having a photographing lens mounted a thereto. The lens barrel is retracted into the collapsible barrel type camera body when the dial operation section 1 is turned to OFF, and extended (out to the broken lines as shown in FIG. 1(b)) when the dial operation Section 1 is turned to a setting other than OFF.

Figure 2:
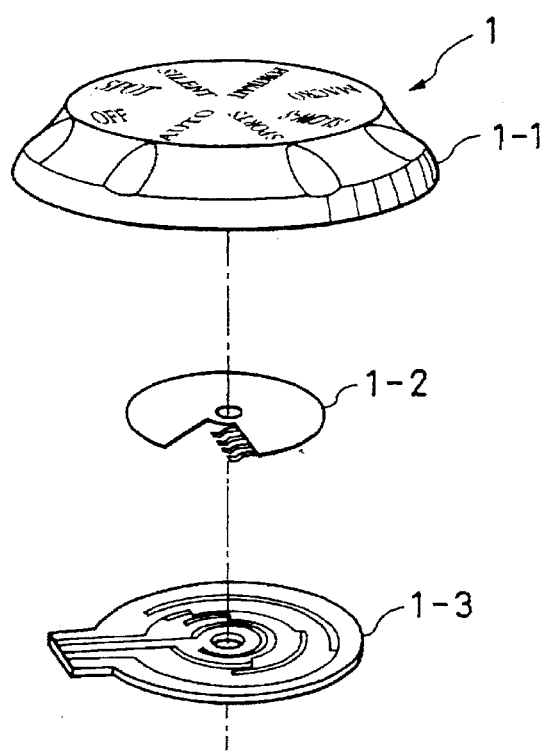
FIG. 2 is a perspective view of the construction of a dial operation section in FIG. 1.

FIG. 2 is a schematic view of an internal construction of the above-described dial operation section 1.

The dial operation section 1, which is fixed in the camera body, comprises an operation section 1—1 having stamped thereon the selectible photographing modes; a mode set contact 1-2 which is fixed to the operation section 1—1 and interlocks with its rotation; and a switch base 1-3, contacting the mode set contact 1-2 and having patterns to change the ON/OFF state of a plurality of switches.

The operation section 1—1 can be manually turned to change the phase difference of the mode set contact 1-2 and the switch base 1-3, which makes it possible to distinguish the plurality of photographing modes, and the main switch ON/OFF states. The mode set contact has four contact sections (of which one is for the common line), while the switch base 1-3 has a pattern for each of the switches and a pattern for the common line. This means that a total of eight modes can be identified, since there are three contact sections available ($2^3=8$).

Though not illustrated, the bottom portion of the operation section 1—1 has grooves cut therein to prevent various mode set positions from shifting easily. The camera body internally stops (as a click) the dial at each mode set position.

Figure 3:
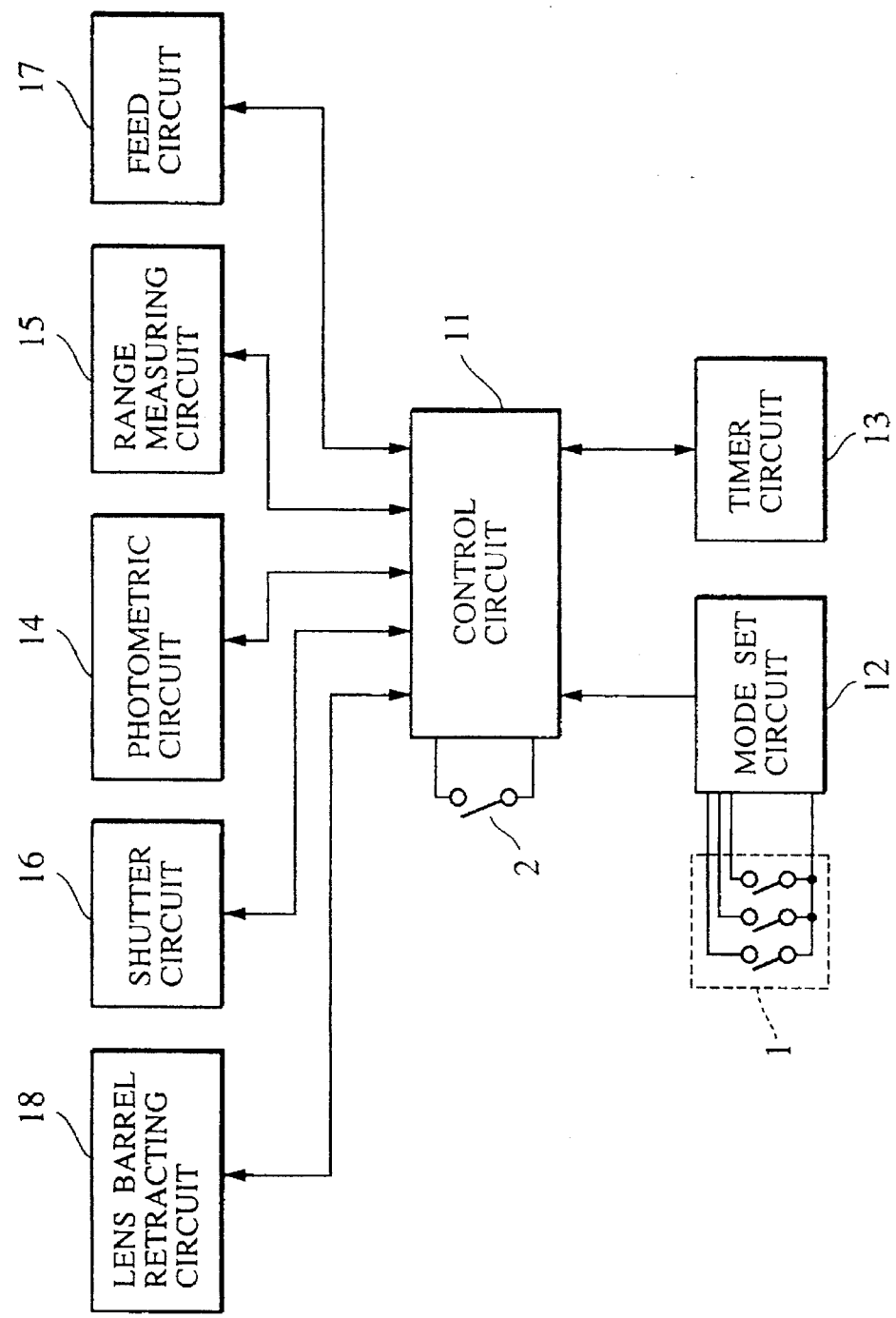
FIG. 3 is a block diagram illustrating an electrical arrangement of the collapsible barrel type camera in each embodiment of the present invention.

FIG. 3 is a block diagram of a principal arrangement of the camera having the above-described construction, in which like parts to those in FIG. 1 are designated using the same reference numerals.

Referring to FIG. 3, reference numeral 11 denotes a control circuit for controlling the entire camera, and which has a CPU, a memory, etc. Reference numeral 12 denotes a mode set circuit which detects the state of the dial operation section 1 (or the sate of the mode set contact 1-2 and that of the switch base 1-3) to identify and set the main switch ON/OFF state or the photographing mode, reference numeral 13 denotes a timer circuit which counts the time required to re-identify the switch state after the dial operation section 1 has been operated, that is after the state of the mode set contact 1-2 and that of the switch base 1-3 have been changed; reference numeral 14 denotes a well-known photometric circuit which measures the luminance of the subject; reference numeral 15 denotes a well-known range measuring circuit which measures the distance to the object; reference numeral 16 denotes a shutter circuit for exposing the film; reference numeral 17 denotes a feed circuit for advancing and rewinding the film; and reference numeral 18 denotes a lens barrel retracting circuit including a motor which drives the lens barrel 3 when the main switch is switched to or from OFF.

Next, the operation of the above-described control circuit 11 will be described with reference to the flowchart of FIG. 4.

[Step 101] A judgment is made as to whether or not the mode switch state has been changed by the dial operation section 1. If it has changed, the following Step 102 is carried out; if not, the Step 103 below is carried out.

[Step 102] A mode set operation is carried out based on the operation of the dial operation section 1 (details will be described with reference to FIG. 5).

[Step 103] After completing the aforementioned Step 102, a judgment is made as to whether or not the lens barrel 3 has been retracted into the camera body. If it has been retracted, the following Step 104 is carried out; if not, the operation is completed.

[Step 104] A judgment is made as to whether or not the release switch 2 has been switched ON. If it has not been switched ON, the Step 101 above and the same operations which follow are carried out; if it has been switched ON, the next Step 105 is carried out.

[Step 105] Here, the release switch 2 has been turned from OFF to a designated mode. Therefore, the photometric circuit carries out a photometric operation, and the range measuring circuit carries out a range measurement operation. Based on the range information obtained, the focus lens (not illustrated) is driven. Then, based on the photometric information obtained (and the film ISO speed), the shutter circuit 16 is controlled to expose the film.

[Step 106] The feed circuit 17 is driven to advance a predetermined amount of film.

With Step 106, the series of operations are completed.

Next, a subroutine of mode setting carried out in the above-described Step 102 will be described with reference to the flowchart shown in FIG. 5.

[Step 201] Based on the contact state of the mode set contact 1-2 and the switch base 1-3 patterns, the setting state of the switches are detected.

[Step 202] A detection is made as to whether or not the mode switch state in the previous Step 201 is the OFF state. If it is, the following Step 203 is carried out; if not, Step 207 is carried out.

First, the operation of the camera at the time when it is in the switch OFF state will be described.

[Step 203] Since the switch OFF state has been set, a time (for example, 400 msec) set by the timer circuit 13 is counted. When the time count is completed, the following Step 204 is carried out.

[Step 204] As in the above-described Step 201, the mode switch state is detected from the contact state of the mode set contact 1-2 and the switch base 1-3 patterns.

[Step 205] A judgment is made as to whether or not the mode switch state in the previous Step 204 is the switch OFF state. When it has been judged that it is again the switch OFF state after the above-described predetermined length of time has elapsed, the switch OFF command is determined to be an intentional OFF. Then, the following Step 206 is carried out. When it has been judged in the Step 205 that the switch state is not the switch OFF state, the switch OFF command is determined to be a command for switching to other modes. The Step 201 above and the same operations which follow are then repeated.

[Step 206] Since the switch OFF state has been set, the circuit 18 is driven to retract the lens barrel 3 into the camera body.

Next, the operation of the camera when it has been judged in Step 202 that the switch state is not the OFF state will be described.

[Step 207] The photographing mode detected in the above-described Step 201 is set.

Figure 4:
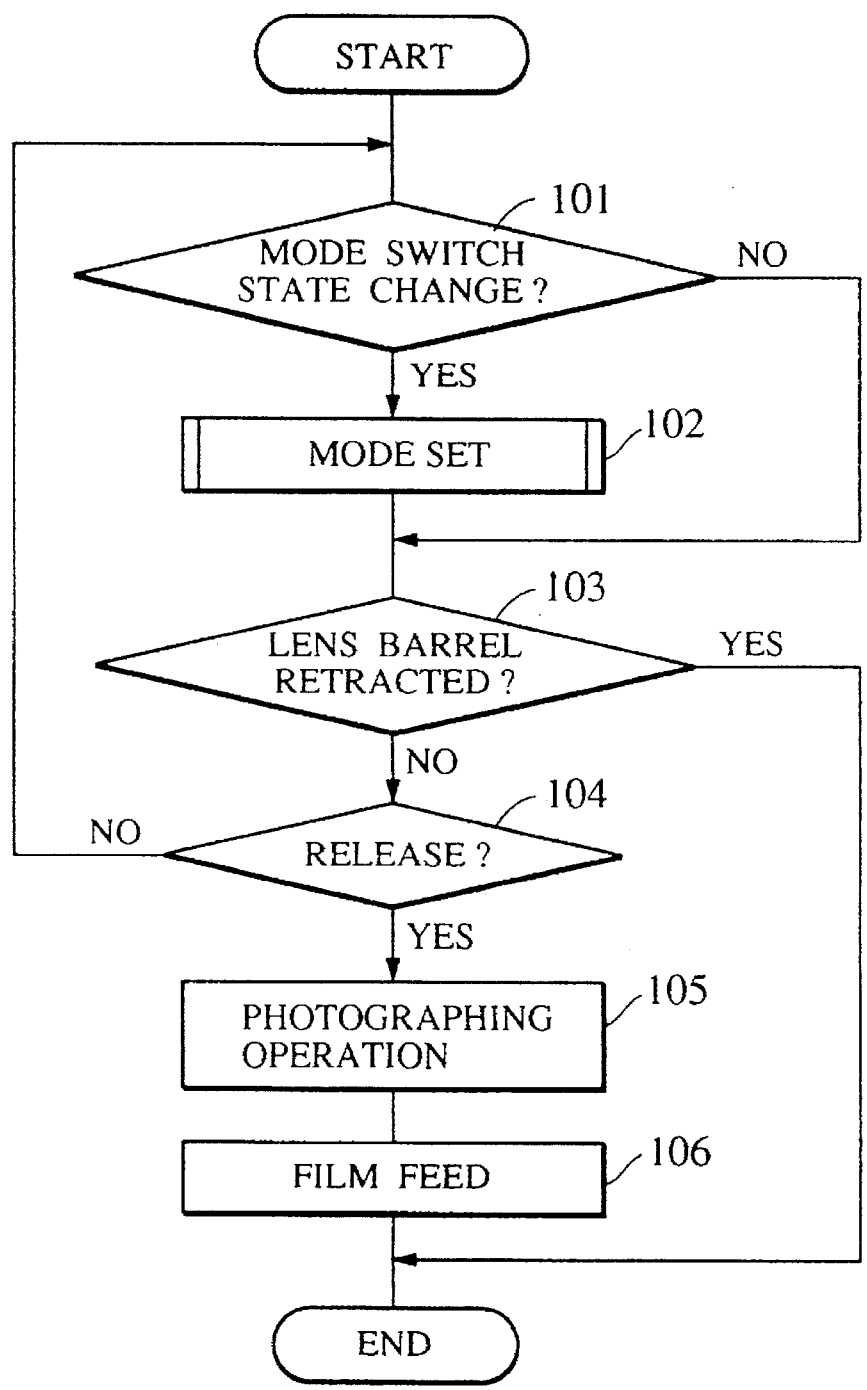
FIG. 4 is a flowchart illustrating a principal operation of the collapsible barrel type camera in a first embodiment of the present invention.
Figure 5:
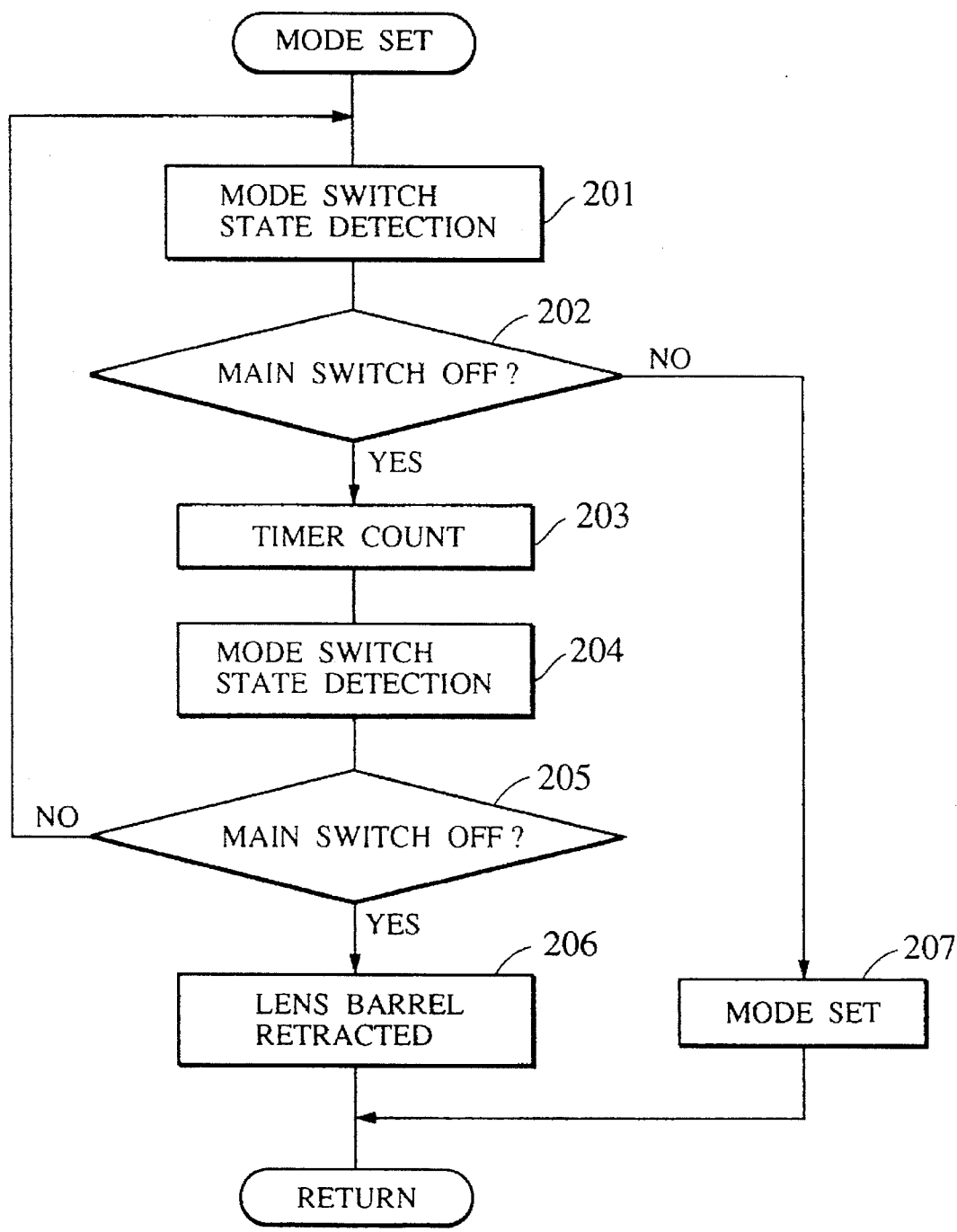
FIG. 5 is a flowchart illustrating a subroutine of the mode set operation in FIG. 4.

After Steps 206 or 207 have been carried out, the subroutine of FIG. 5 returns to Step 103 of FIG. 4.

Second Embodiment

In the above-described first embodiment, the switch state is re-detected to lengthen the mode identifying time only when the camera has been changed to or through the switch OFF state. However, the switch state of other modes must be re-detected.

A second embodiment of the present invention will be described below. In this embodiment, the switch state for other modes is re-detected even if the OFF state hasn't been detected. The time required for mode identification is lengthened when the camera has been changed to or through the switch OFF state by increasing the amount of time required to re-detect the switch state in other modes.

Figure 6:
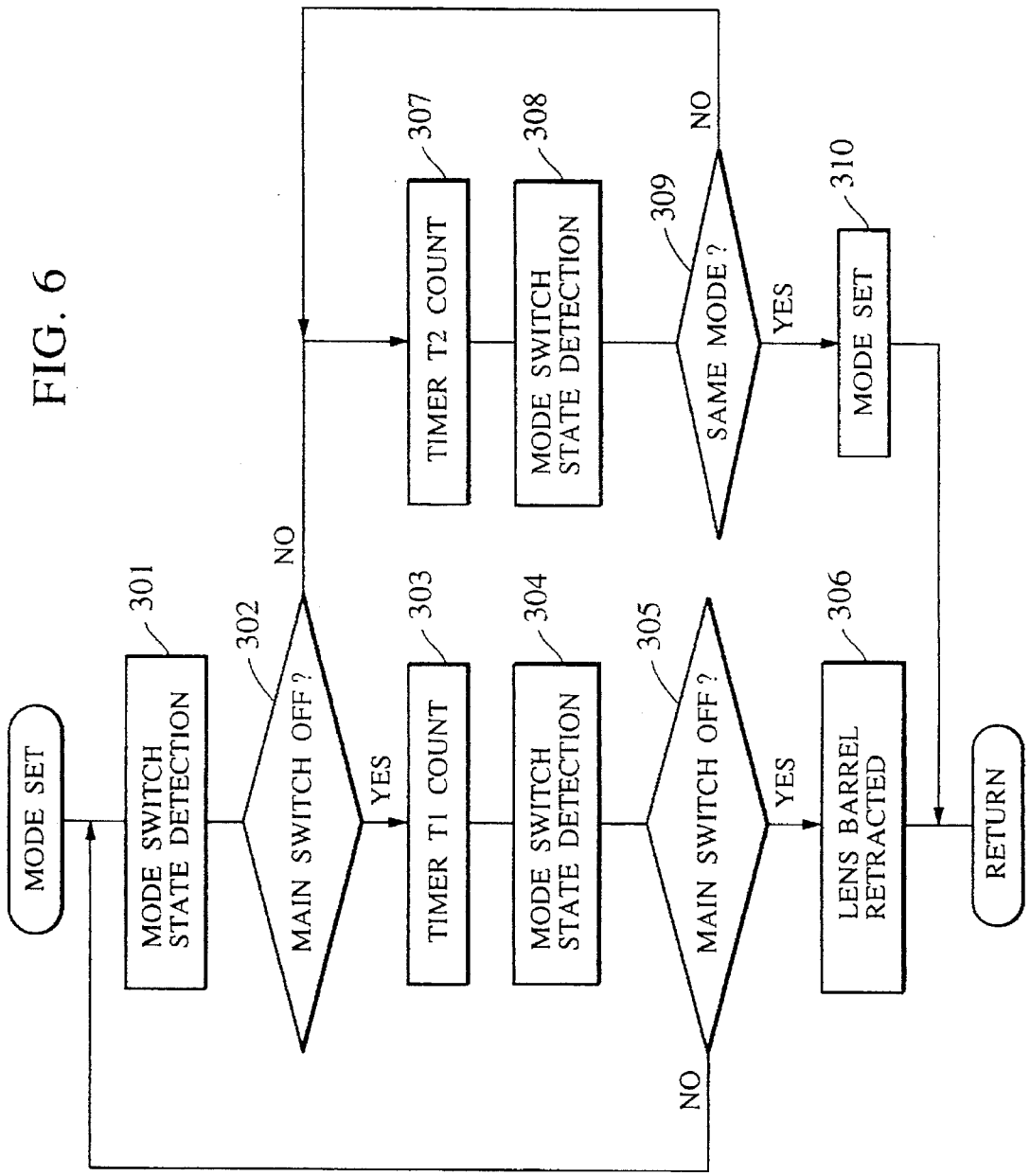
FIG. 6 is a flowchart illustrating a subroutine of the mode setting operation of the collapsible barrel type camera in a second embodiment of the present invention.

FIG. 6 is a flowchart showing a subroutine of the mode setting in the second embodiment of the present invention. In this embodiment, the switch set state is detected and recorded in a memory in the control circuit 11.

[Step 301] Based on the contact state of the mode set contact 1-2 and the switch base 103 patterns, the switch set state is detected.

[Step 302] A detection is made as to whether or not the switch state set in the above-described Step 301 is the OFF state. If it is, the following Step 303 is carried out, while if it is not, Step 307 is carried out.

First, the operation of the camera when it is in a main switch OFF state will be described.

[Step 303] Since the main switch OFF state has been set, a time T1 (for example, 400 msec) set by the timer circuit 13 is counted. Upon completion, the following Step 304 is carried out.

[Step 304] As in the above-described Step 301, based on the contact state of the mode set contact 1-2 and the switch base 1-3 patterns, the switch set state is again detected.

[Step 305] A judgment is made as to whether or not the switch state is the switch OFF state in the above-described Step 304. When it has been judged that the switch state is gain the switch OFF state after the aforementioned predetermined time T1 has elapsed, the switch OFF command is determined to be an intentional OFF. The following Step 306 is carried out. When it has been judged that the switch state is not the switch OFF state, the switch OFF command is determined to be a command for switching to other modes. The Step 301 and the same operations which follow are repeated.

[Step 306] Since the switch OFF state has been set, the lens barrel retracting circuit 18 is driven to retract the lens barrel 3 into the camera body.

Next the operation of the camera when it has been judged in Step 302 that the switch state is not the OFF state, Will be described. In this case, Step 307 is directly carried out from Step 302.

[Step 307] Since the main switch OFF state has been set, a time T2 (for example, 50 msec) set by the timer circuit 13 is counted. Upon completion, the procedure moves to Step 308.

As apparent from the above, the relationship between the time T1 and T2 set by the timer circuit 13 is T1>T2.

[Step 308] As in the above-described Step 301, from the contact sate of the mode set contact 1-2 and the switch base 1-3 patterns, the switch setting state is detected.

[Step 309] A judgment is made as to whether or not the switch state stored in the memory in the control circuit 11 is identical to the switch state detected in Step 308. If they are the same, the following Step 310 is carried out; if not, the switch information detected in Step 308 is restored in the memory in the control circuit 11, and the Step 307 above is carried out again.

[Step 310] A mode is set in accordance with the switch set state detected in Step 308.

Third Embodiment

In the third embodiment of the present invention, it is assumed that detection of the state of the mode switch is repeatedly carried out. The time required to identify the mode is made longer by increasing the number of times the aforementioned detection is carried out only when the camera is changed to or through a switch OFF state as compared to changes to other modes.

Figure 7:
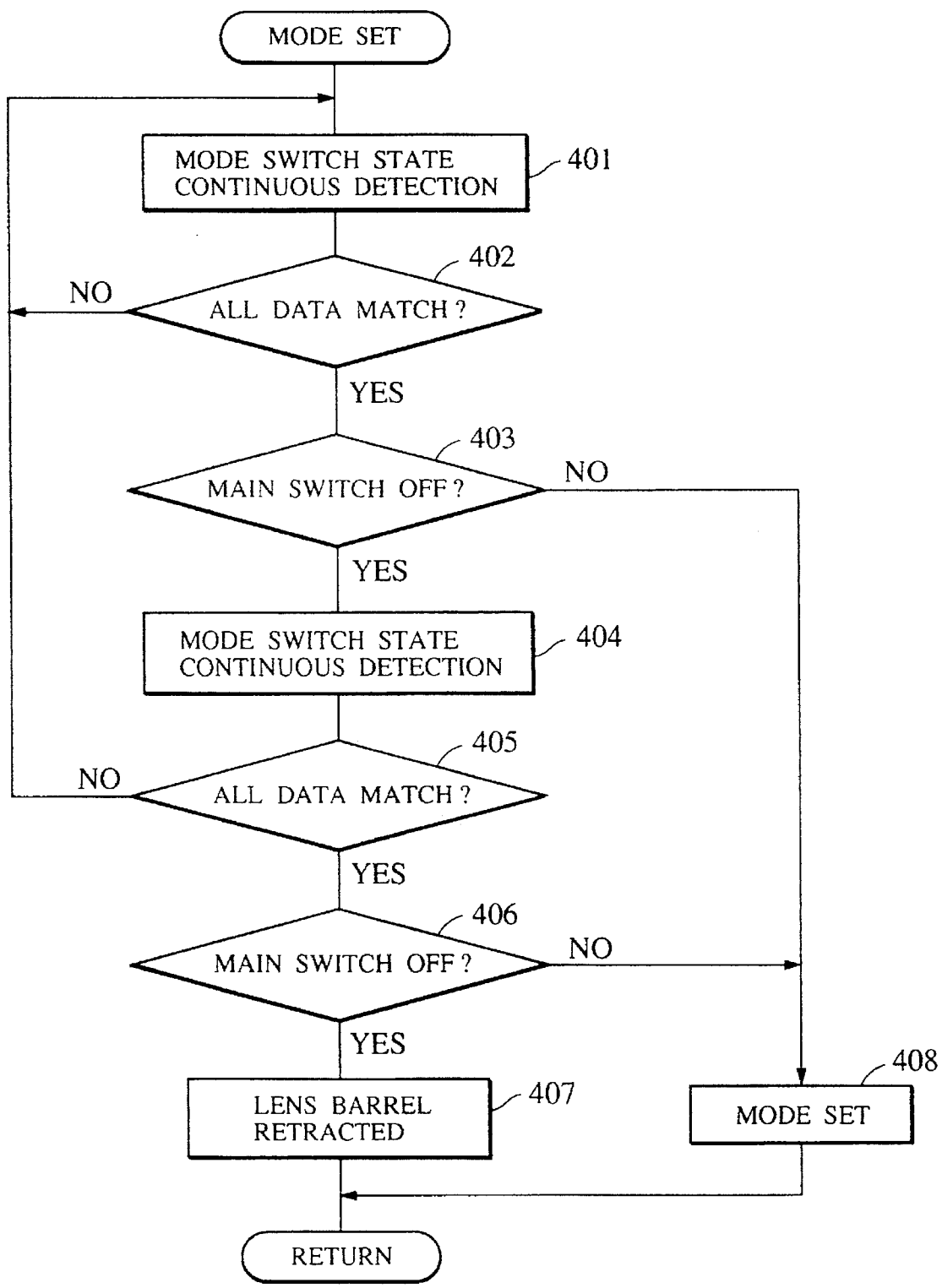
FIG. 7 is a flowchart illustrating a subroutine of the mode setting operation of the collapsible barrel type camera in a third embodiment of the present invention.

FIG. 7 is a flowchart of a subroutine of the mode setting in the third embodiment of the present invention.

[Step 401] Based on the contact state of the mode setting contact 1-2 and the switch base 1-3 patterns, the switch state is detected successively (for example, three times), and the detected information is stored in the memory of the control circuit 11.

[Step 402] A judgment is made as to whether or not information stored in the memory of the control circuit 11 in the above-described Step 401 are all identical. If they are identical, the information is stored in the memory of the control circuit 11 as mode information. Then, the following Step 403 is carried out. If not, the Step 401 is carried out again.

[Step 403] A detection is made as to whether or not the stored mode information in the above-described Step 402 is a main switch OFF command. If it is, the following Step 404 is carried out; and if not, Step 408 below is carried out.

First the operation of the camera when it is in the main switch OFF state will be described.

[Step 404] As in the above-described Step 401, from the contact state of the mode set contract 1-2 and the switch base 1-3 patterns, the switch setting state is successively detected (for example, three times), and the detected information is stored in the memory i the control circuit 11.

[Step 405] As in the above-described Step 402, a judgment is made as to whether or not all information stored in the memory in the control circuit 11 in the above-described Step 404 are all identical. If they are, the information is stored in the memory in the control circuit 11 as mode information. Then, the Step 403 above is carried out. If they are not, the Step 401 is carried out again.

[Step 406] As in the above-described Step 403, a detection is made as to whether or not the stored mode information in the above-described Step 405 is a main switch OFF command. If it is, the Step 406 is carried out; and if it is not, Step 408 below is carried out.

[Step 407] Since the main switch OFF state has been set, the lens barrel retracting circuit 18 is driven to retract the lens barrel 3 back into the camera body.

Next, the operation of the camera, judged as not being in the main switch OFF state in Step 403 or Step 406, will be described. In this case, Step 40 is carried out directly.

[Step 408] A mode is set in accordance with the switch state detected in the above-described Step 401 or Step 404.

According to each of the above-described embodiments, when the dial operation section 11 is used to switch the main switch to the OFF state, the time required to identify the set switching state by means of the dial operation section 11 is made longer, that is the time interval required from detecting the switch state once to re-detect the same is made longer, as compared to when a photographing mode is changed to another photographing mode. Therefore, while the user is setting a photographing mode and by mistake sets the main switch off state even for one instant, the lens barrel is not retraced.

To make the camera easier to operate, the frequently used photographing modes are placed on both sides of the main switch OFF position. In this case, as described above, the dial is frequently passed over the main switch OFF position to set the photographing mode. However, even in such a case, no inconvenience arises because the lens barrel is no longer retracted into the camera each time the main switch OFF position is passed by.

Time is provided for identifying the set switch state or the switch is set for a longer period, when the camera is switched to or through a switch OFF state. Therefore, this causes the camera to operate in accordance with the desired switch state, so that the operator will not loose the opportunity to operate the shutter.

Each of the embodiments and their technical ideas may be combined, if necessary.

In the present invention, the modes to be set are not limited to the photographing modes of the embodiments. Other types of modes are also applicable.

In the present invention, the way in which the lens barrel is retracted into the camera is not limited to those in the embodiment. The lens barrel may be retracted into the camera in other ways.

In the present invention, what is to be retracted is not limited to a photographing lens. The structure is applicable to other optical units.

In the present invention, the mode setting member is not limited to the dial of this embodiment. Other types of mode setting members are also applicable.

In the present invention, the time period which is set until the mode is set is not limited to those of the embodiments. It may be set freely, as appropriate.

The present invention is applicable to various types of cameras such as a single-lens reflex camera, a lens shutter camera, or a video camera. In addition, it is applicable to optical apparatuses besides a camera or other apparatuses. It is further applicable as a product of a component part of the camera, optical apparatuses, or other types of apparatuses.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. Apparatus for delaying an optical unit using a driver comprising:

a control circuit for (i) determining that a mode setting switch has been turned to a first mode setting for setting a first mode, (ii) waiting for a first predetermined time after it has been determined that the mode setting switch has been turned to the first mode setting, (iii) determining that the mode setting switch has been turned from the first mode setting, and (iv) causing the driver to move the optical unit after the first predetermined time if it has not been determined that the mode setting switch has been turned from the first mode setting, said control circuit starting a second mode different than the first mode after the mode setting has been turned to a second mode setting for setting the second mode before the first predetermined time.

2. Apparatus in accordance with claim 1, wherein said control circuit (v) determines that the mode setting switch has been turned to the second mode setting, (vi) waits for a second predetermined time, which is less than the first predetermined time, after it has been determined that the mode setting switch has been turned to the second mode setting, (vii) determines that the mode setting switch has been turned to the second mode setting, and (viii) sets the second mode after the second predetermined time if it has not been determined that the mode setting switch has been turned from the second mode setting.

3. Apparatus in accordance with claim 2, wherein said control circuit causes the driver to extend the optical unit in the second mode.

4. Apparatus in accordance with claim 1, wherein said control circuit includes a memory, and wherein said control circuit repetitively determines that the mode setting switch has not been turned from the first mode setting for the first predetermined time, said control circuit storing in said memory data corresponding to each of the repetitive determinations, and wherein said control circuit determines whether the stored data matches.

5. Apparatus according to claim 1, wherein said apparatus comprises a camera.

6. Apparatus according to claim 1, wherein said apparatus comprises an optical device.

7. Apparatus according to claim 1, wherein said optical unit comprises a photographic optical system.

8. Apparatus according to claim 1, wherein said control circuit comprises means for causing the driver to withdraw the optical unit the first predetermined time.

9. Apparatus according to claim 1, wherein said control circuit comprises means for determining the first mode setting as an OFF mode setting for setting an OFF mode.

10. Apparatus according to claim 1, further comprising a manual operation member for operating the mode setting switch.

11. Apparatus according to claim 10, wherein said manual operation member comprises means for successively turning the mode setting switch from the second mode setting, the first mode setting, and a third mode setting.

12. Apparatus according to claim 10, wherein said manual operation member comprises means for turning the mode setting switch in accordance with movement of said manual operation member.

13. Apparatus according to claim 10, wherein said manual operation member comprises a dial operation member.

14. Apparatus according to claim 1, wherein said apparatus comprises a driver.

15. Apparatus according to claim 14, wherein said driver comprises a motor.

* * * * *

UNITED STATES PATENT AND TRADEMARK OFFICE
CERTIFICATE OF CORRECTION

PATENT NO. : 5,664,240          Page 1 of 2
DATED      : September 2, 1997
INVENTOR(S): HIROSHI ARITA, ET AL.

It is certified that error appears in the above-identified patent and that said Letters Patent is hereby corrected as shown below:

COLUMN 1

Line 43, "s" should read --a--.

COLUMN 2

Line 23, "a" should be deleted.
    Line 27, "Section" should read --section--.
    Line 31, "1–1" should read --1-1--.
    Line 37, "1–1" should read --1-1--.
    Line 48, "1–1" should read --1-1--.
    Line 33, "1-1" should read --1-1--.

COLUMN 4

Line 56, "gain" should read --again--.

COLUMN 5

Line 2, "Will" should read --will--.
    Line 12, "sate" should read --state--.
    Line 57, "i" should read --in--.

UNITED STATES PATENT AND TRADEMARK OFFICE
CERTIFICATE OF CORRECTION

PATENT NO. :   5,664,240
DATED      :   September 2, 1997
INVENTOR(S):   HIROSHI ARITA, ET AL.

It is certified that error appears in the above-identified patent and that said Letters Patent is hereby corrected as shown below:

<u>COLUMN 6</u>

Line 8, "40" should read --407--.

<u>COLUMN 7</u>

Line 10, "driver" should read --driver,--.

<u>COLUMN 8</u>

Line 17, "unit" should read --unit after--.

Signed and Sealed this

Twelfth Day of May, 1998

Attest:

BRUCE LEHMAN

Attesting Officer   Commissioner of Patents and Trademarks